United States Patent
Lu et al.

(10) Patent No.: US 9,478,999 B2
(45) Date of Patent: Oct. 25, 2016

(54) MOBILE ELECTRONIC SYSTEM AND CHARGING ACCESSORY

(71) Applicant: HTC Corporation, Taoyuan County (TW)

(72) Inventors: Ming-Chu Lu, Taoyuan County (TW); Tzu-Hsun Tung, Taoyuan County (TW); Chih-Chung Teng, Taoyuan County (TW); Tsung-Pao Kuan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 340 days.

(21) Appl. No.: 13/792,239

(22) Filed: Mar. 11, 2013

(65) Prior Publication Data
US 2014/0253015 A1  Sep. 11, 2014

(51) Int. Cl.
*H02J 7/00* (2006.01)

(52) U.S. Cl.
CPC ............ *H02J 7/0052* (2013.01); *H02J 7/0054* (2013.01); *H02J 2007/0062* (2013.01); *H02J 2007/0096* (2013.01)

(58) Field of Classification Search
CPC . H02J 7/0086; H02J 7/045; H02J 2007/0037
USPC .......................... 320/103, 107, 111, 114, 115
See application file for complete search history.

(56) References Cited

U.S. PATENT DOCUMENTS

| | | | | |
|---|---|---|---|---|
| 2006/0087283 A1* | 4/2006 | Phillips et al. | | 320/114 |
| 2006/0226805 A1* | 10/2006 | Yu | | 320/107 |
| 2008/0238357 A1* | 10/2008 | Bourilkov et al. | | 320/106 |
| 2012/0091966 A1* | 4/2012 | Mori | | 320/134 |
| 2013/0063079 A1* | 3/2013 | Kawai et al. | | 320/107 |

FOREIGN PATENT DOCUMENTS

| | | |
|---|---|---|
| CN | 2041866 | 7/1989 |
| CN | 1163500 | 10/1997 |
| CN | 200962530 | 10/2007 |
| CN | 101421901 | 4/2009 |
| CN | 202616848 | 12/2012 |
| GB | 2386267 | 9/2003 |
| JP | 2000278869 | 10/2000 |

OTHER PUBLICATIONS

"Office Action of Taiwan Counterpart Application", issued on Mar. 12, 2015, p. 1-p. 9.
"Office Action of German Counterpart Application", issued on Aug. 20, 2015, p. 1-p. 10.
"Office Action of Chinese Counterpart Application", issued on Sep. 17, 2015, p. 1-p. 8.

* cited by examiner

*Primary Examiner* — Richard V Muralidar
(74) *Attorney, Agent, or Firm* — Jianq Chyun IP Office

(57) ABSTRACT

A mobile electronic system including a mobile electronic device and a charging accessory is provided. The mobile electronic device includes a first connector and a battery. The charging accessory includes a second connector. The first connector and the second connector are configured to couple the mobile electronic device and the charging accessory. When the charging accessory is coupled to an alternating-current voltage and the mobile electronic device, the charging accessory converts the alternating-current voltage into a direct-current voltage, detects an instantaneous voltage of the battery, determines the value of the direct-current voltage according to the instantaneous voltage, and outputs the direct-current voltage to charge the battery.

16 Claims, 3 Drawing Sheets

MOBILE ELECTRONIC SYSTEM AND CHARGING ACCESSORY

BACKGROUND OF THE INVENTION

1. Field of the Invention

The present invention generally relates to a mobile electronic system, and more particularly, to a mobile electronic device and a charging accessory.

2. Description of Related Art

A mobile phone needs to be charged frequently. A conventional adapter or the latest universal serial bus (USB) charging mechanism can be adopted for charging a mobile phone.

As shown in FIG. 1, the mobile phone 100 includes a charging circuit 110 and a battery 120. The mobile phone 100 receives a charging voltage from a USB cable 130 to charge the battery 120. The standard charging voltage supplied by a USB is 5 volts. However, the rated voltage of the battery 120 may not be 5 volts. Instead, the rated voltage of the battery 120 may be 3 volts, 3.5 volts, or 4 volts. The charging circuit 110 detects an instantaneous voltage 125 of the battery 120 and converts the charging voltage (5 volts) supplied by the USB cable 130 into a suitable voltage according to the instantaneous voltage 125 to charge the battery 120.

As to a user, the faster a mobile phone is charged, the better. However, a quick charge requires the charging circuit to supply a large enough charging current. With the limited heat dissipation capability and internal space of any existing mobile phone, the charging current supplied by the charging circuit of the mobile phone is not very large (usually no more than 1 ampere), which therefore is insufficient for satisfying the user's demand for quick charge.

In addition, the problem of insufficient charging voltage also exists in mobile phones. For example, assuming that the voltage supplied by the USB cable 130 comes with an offset and actually 4.95 volts is supplied by the USB cable 130, and the charging voltage required by the battery 120 is 4.35 volts, in order to quickly charge the battery 120, the charging circuit 110 has to supply a current of 3 amperes. It can be understood through calculation that the voltage drop from the USB cable 130 to the battery 120 has to be equal to or smaller than 0.6 volts. Namely, the resistance from the USB cable 130 to the battery 120 has to be equal to or smaller than 200 milliohms. However, because the USB cable 130 usually has a resistance of 300 milliohms and the charging circuit 110 usually has a resistance of 100 milliohms, the total resistance (400 milliohms) exceeds the tolerable upper limit. This is one of the problems to be resolved in order to quickly charge a mobile phone.

SUMMARY OF THE INVENTION

Accordingly, the present invention is directed to a mobile electronic system and a charging accessory, in which the problems of insufficient charging current and insufficient charging voltage in a quick charge procedure are resolved.

The present invention provides a mobile electronic system including a mobile electronic device and a charging accessory. The mobile electronic device includes a first connector and a battery. The charging accessory includes a second connector. The first connector and the second connector are configured to couple the mobile electronic device and the charging accessory. When the charging accessory is coupled to an alternating-current voltage and the mobile electronic device, the charging accessory converts the alternating-current voltage into a direct-current voltage, detects an instantaneous voltage of the battery, determines the value of the direct-current voltage according to the instantaneous voltage, and outputs the direct-current voltage to charge the battery.

The present invention provides a charging accessory adapted to a mobile electronic device. The mobile electronic device includes a first connector and a battery. The charging accessory includes a second connector, a rectifier, and a charging circuit. The first connector and the second connector are configured to couple the mobile electronic device and the charging accessory. The charging circuit is coupled between the rectifier and the second connector. When the charging accessory is coupled to an alternating-current voltage and the mobile electronic device, the rectifier converts the alternating-current voltage into a first direct-current voltage. The charging circuit converts the first direct-current voltage into a second direct-current voltage, detects an instantaneous voltage of the battery, determines the value of the second direct-current voltage according to the instantaneous voltage, and outputs the second direct-current voltage to charge the battery.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
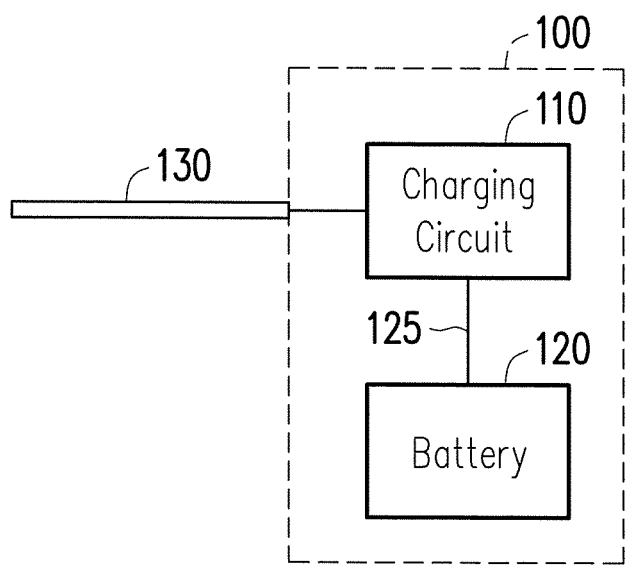
FIG. 1 is a diagram of a conventional mobile phone.

Reference will now be made in detail to the present preferred embodiments of the invention, examples of which are illustrated in the accompanying drawings. Wherever possible, the same reference numbers are used in the drawings and the description to refer to the same or like parts.

Figure 2:
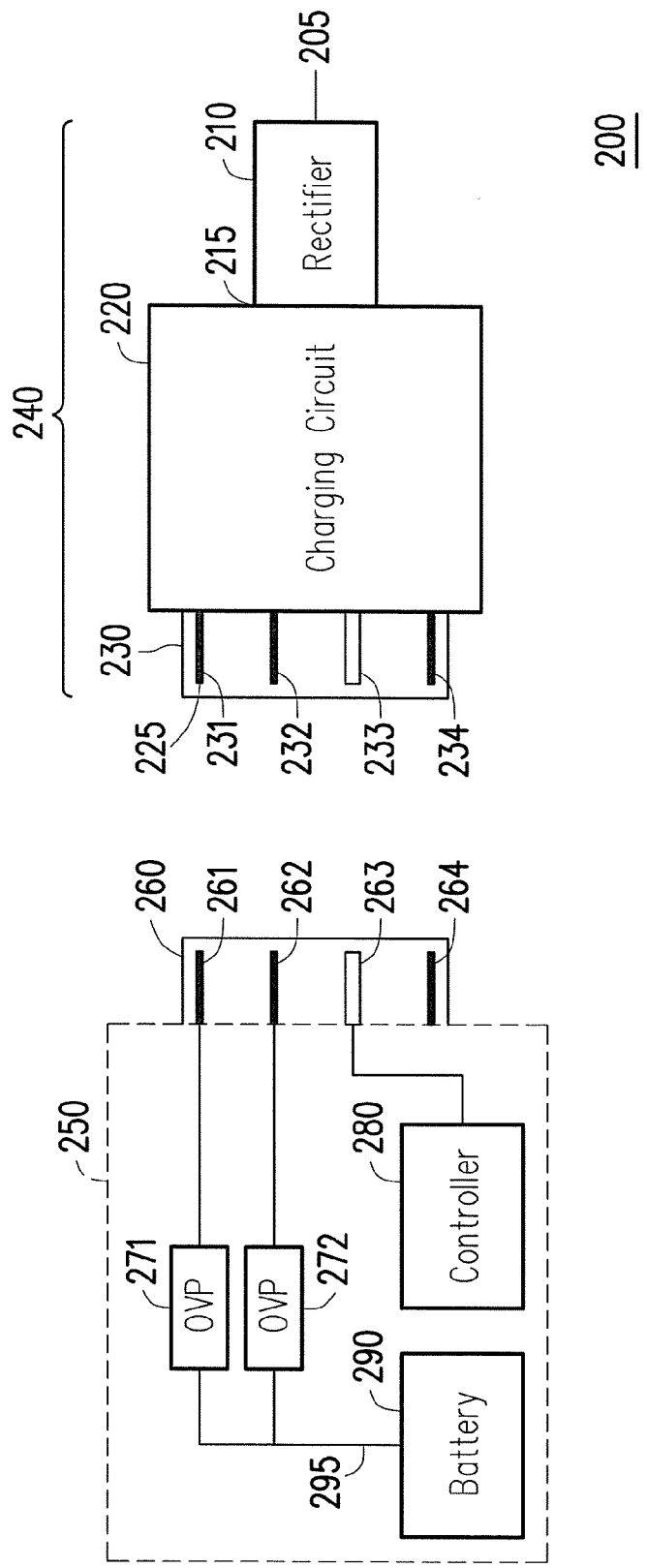
FIG. 2 is a diagram of a mobile electronic system according to an embodiment of the present invention.

FIG. 2 is a diagram of a mobile electronic system 200 according to an embodiment of the present invention. The mobile electronic system 200 includes a mobile electronic device 250 and a charging accessory 240. The mobile electronic device 250 may be a mobile phone, a personal digital assistant (PDA), or a tablet computer. The charging accessory 240 is used for charging the mobile electronic device 250.

The mobile electronic device 250 includes a connector 260, over-voltage protection (OVP) circuits 271 and 272, a controller 280, and a battery 290. The controller 280 may be a central processing unit (CPU), a processor, a microprocessor, or an embedded controller (EC) of the mobile electronic device 250. The connector 260 includes pins 261, 262, and 264, and a communication interface 263. The pin 261 is coupled to the battery 290 through the OVP circuit 271, and the pin 262 is coupled to the battery 290 through the OVP circuit 272. The communication interface 263 is coupled to the controller 280. The pin 264 is coupled to a ground of the mobile electronic device 250.

The charging accessory 240 includes a connector 230, a charging circuit 220, and a rectifier 210. The charging circuit 220 is coupled between the rectifier 210 and the connector 230. The connector 230 includes pins 231, 232, and 234 and a communication interface 233 coupled to the charging circuit 220. The pin 234 is also coupled to the ground of the charging accessory 240.

The connector 260 and the connector 230 are configured to couple the mobile electronic device 250 and the charging accessory 240. When the mobile electronic device 250 and the charging accessory 240 are coupled with each other through the connector 260 and the connector 230, the pin 261 and the pin 231 are coupled with each other, the pin 262 and the pin 232 are coupled with each other, the communication interface 263 and the communication interface 233 are coupled with each other, the pin 264 and the pin 234 are coupled with each other, and the pin 264 and the pin 234 become a common ground of the mobile electronic device 250 and the charging accessory 240.

When the charging accessory 240 is coupled to both an alternating-current voltage 205 and the mobile electronic device 250, the charging accessory 240 charges the mobile electronic device 250. The alternating-current voltage 205 is usually supplied by a domestic AC power source. Then, the rectifier 210 converts the alternating-current voltage 205 into a direct-current voltage 215. The charging circuit 220 converts the direct-current voltage 215 into a lower direct-current voltage 225 and outputs the direct-current voltage 225 through the pin 231 and the pin 261 to charge the battery 290. The charging circuit 220 precisely detects an instantaneous voltage 295 of the battery 290 through the pin 262 and the pin 232 and determines the value of the direct-current voltage 225 according to the instantaneous voltage 295, so as to supply a most suitable charging voltage to the battery 290. The direct-current voltage 225 is usually greater than or equal to the instantaneous voltage 295 of the battery 290. During this charging procedure, the OVP circuits 271 and 272 protect the battery 290 and the mobile electronic device 250.

When the mobile electronic device 250 is charged, the charging circuit 220 receives a charging specification of the battery 290 from the controller 280 through the communication interface 233 and the communication interface 263. The charging circuit 220 charges the battery 290 according to the charging specification. The communication interface 233 and the communication interface 263 may include a single circuit and adopt a 1-wire protocol, such as the Dallas protocol. Or, the communication interface 233 and the communication interface 263 may include two circuits and adopt a 2-wire protocol, such as the inter-integrated circuit (I2C) protocol. Additionally, the communication interface 233 and the communication interface 263 may also adopt any other structure and any other communication protocol.

The charging specification of the battery 290 includes the rated voltage of the battery 290 and the maximum charging current acceptable to the battery 290. The charging circuit 220 controls the charging procedure of the battery 290 to prevent the instantaneous voltage 295 of the battery 290 from exceeding aforementioned rated voltage and the current supplied by the direct-current voltage 225 to the battery 290 from exceeding aforementioned maximum charging current, so that the battery 290 won't be over-charged or even damaged. Once the charging circuit 220 obtains the maximum charging current of the battery 290, the charging circuit 220 can also supply an optimal charging current to the battery 290.

Figure 3:
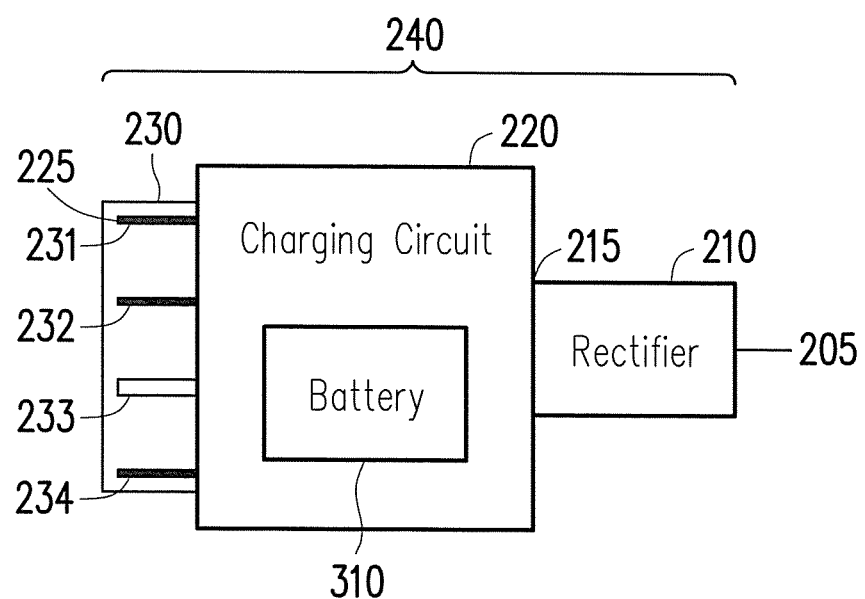
FIG. 3 is a diagram of a charging accessory according to an embodiment of the present invention.

FIG. 3 is a diagram of the charging accessory 240 according to another embodiment of the present invention. The major difference between the charging accessory 240 in the present embodiment and the charging accessory 240 in previous embodiment is that in the charging accessory 240 of the present embodiment, the charging circuit 220 includes a battery 310. The battery 310 stores more electric power than the battery 290.

When the charging accessory 240 is coupled to the alternating-current voltage 205 but not coupled to the mobile electronic device 250, the charging circuit 220 charges the battery 310 as a backup with the direct-current voltage 215 supplied by the rectifier 210. When the charging accessory 240 is coupled to the mobile electronic device 250 but not coupled to the alternating-current voltage 205, the charging circuit 220 outputs the direct-current voltage 225 by using the electric power stored in the battery 310 through the pin 231 and the pin 261 to charge the battery 290.

As described above, in the present invention, a charging circuit is disposed outside a mobile electronic device such that the problems of insufficient charging current and insufficient charging voltage during a quick charge procedure of the mobile electronic device can be resolved. This external charging circuit does not have the heat dissipation problem inside the mobile electronic device and is not limited by the internal space of the mobile electronic device. Thus, this charging circuit can supply a large charging current therefore can fulfil the user's demand for quick charge.

In the present invention, the circuit between the external charging circuit and the battery of the mobile electronic device has a simple layout, a small resistance, and accordingly a small voltage drop. Thus, the problem of insufficient charging voltage during the quick charge procedure can be resolved. Moreover, in the present invention, the external charging circuit is not restricted by any existing standard or specification therefore can supply a large charging voltage to tolerate aforementioned voltage drop, which also helps to resolve the problem of insufficient charging voltage during the quick charge procedure.

A battery inside aforementioned external charging circuit can be used as a backup battery in order to bring a more satisfactory experience to the user. A user can carry the charging accessory provided by the present invention around, and when the mobile electronic device is low in battery, use the backup battery in the charging accessory to supply electric power to the mobile electronic device, so that no domestic AC power source or USB power supply of any personal computer is required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A mobile electronic system, comprising:
  a mobile electronic device, comprising a first connector and a first battery, wherein the first connector comprises a first pin, a second pin and a fifth pin, wherein the first pin and the second pin are coupled to the first battery, and the fifth pin is coupled to a ground of the mobile electronic device; and a charging accessory, comprising a second connector, wherein the second connector comprises a third pin, a fourth pin and a sixth pin, wherein the third pin and the fourth pin are coupled to the charging accessory, and the sixth pin is coupled to a ground of the charging accessory, wherein the first connector and the second connector are configured to couple the mobile electronic device and the charging accessory, wherein when the mobile electronic device and the charging accessory are coupled with each other through the first connector and the second connector, the first pin is coupled to the third pin, the second pin is coupled to the fourth pin, and the fifth pin and the sixth pin are coupled with each other and become a common ground of the mobile electronic device and the charging accessory, wherein when the charging accessory is coupled to an alternating-current voltage and the mobile electronic device, the charging accessory converts the alternating-current voltage into a first direct-current voltage, detects an instantaneous voltage of the first battery, determines a value of the first direct-current voltage according to the instantaneous voltage, and outputs the first direct-current voltage to charge the first battery, wherein the charging accessory outputs the first direct-current voltage through the first pin, the third pin, the fifth pin and the sixth pin to charge the first battery, and the charging accessory detects the instantaneous voltage through the second pin, the fourth pin, the fifth pin and the sixth pin.

2. The mobile electronic system according to claim 1, wherein the first direct-current voltage is greater than or equal to the instantaneous voltage.

3. The mobile electronic system according to claim 1, wherein the charging accessory further comprises:
   a rectifier, converting the alternating-current voltage into a second direct-current voltage; and
   a charging circuit, coupled between the rectifier and the second connector, converting the second direct-current voltage into the first direct-current voltage, detecting the instantaneous voltage, determining the value of the first direct-current voltage according to the instantaneous voltage, and outputting the first direct-current voltage to charge the first battery.

4. The mobile electronic system according to claim 3, wherein the charging circuit outputs the first direct-current voltage through the first pin and the third pin to charge the first battery, and the charging circuit detects the instantaneous voltage through the second pin and the fourth pin.

5. The mobile electronic system according to claim 4, wherein the mobile electronic device further comprises:
   a first over-voltage protection (OVP) circuit, coupled between the first pin and the first battery; and
   a second OVP circuit, coupled between the second pin and the first battery.

6. The mobile electronic system according to claim 3, wherein the mobile electronic device further comprises a controller, and the controller is coupled to the first connector; when the mobile electronic device and the charging accessory are coupled with each other through the first connector and the second connector, the charging circuit receives a charging specification of the first battery from the controller through the first connector and the second connector, and the charging circuit charges the first battery according to the charging specification.

7. The mobile electronic system according to claim 6, wherein the first connector further comprises a first communication interface, and the first communication interface is coupled to the controller; the second connector further comprises a second communication interface, and the second communication interface is coupled to the charging circuit; when the mobile electronic device and the charging accessory are coupled with each other through the first connector and the second connector, the first communication interface and the second communication interface are coupled with each other, and the charging circuit receives the charging specification from the controller through the first communication interface and the second communication interface.

8. The mobile electronic system according to claim 6, wherein the charging specification comprises a rated voltage of the first battery, and the charging circuit controls a charging procedure of the first battery to prevent the instantaneous voltage from exceeding the rated voltage.

9. The mobile electronic system according to claim 6, wherein the charging specification comprises a maximum charging current of the first battery, and the charging circuit controls a charging procedure of the first battery to prevent a current supplied by the first direct-current voltage to the first battery from exceeding the maximum charging current.

10. The mobile electronic system according to claim 3, wherein the charging circuit comprises a second battery; when the charging accessory is coupled to the alternating-current voltage and not coupled to the mobile electronic device, the charging circuit charges the second battery with the second direct-current voltage; when the charging accessory is coupled to the mobile electronic device and not coupled to the alternating-current voltage, the charging circuit outputs the first direct-current voltage from the second battery to charge the first battery.

11. A charging accessory, adapted to a mobile electronic device, wherein the mobile electronic device comprises a first connector and a first battery, wherein the first connector comprises a first pin, a second pin and a fifth pin, wherein the first pin and the second pin are coupled to the first battery, the charging accessory comprising:
   a second connector, wherein the first connector and the second connector are configured to couple the mobile electronic device and the charging accessory, and the second connector comprises a third pin, a fourth pin and a sixth pin;
   a rectifier; and
   a charging circuit, coupled between the rectifier and the second connector, wherein the third pin and the fourth pin are coupled to the charging circuit, and the sixth pin is coupled to a ground of the charging circuit,
   wherein when the charging accessory is coupled to an alternating-current voltage and the mobile electronic device, the rectifier converts the alternating-current voltage into a first direct-current voltage;
   wherein the charging circuit converts the first direct-current voltage into a second direct-current voltage, detects an instantaneous voltage of the first battery, determines a value of the second direct-current voltage according to the instantaneous voltage, and outputs the second direct-current voltage to charge the first battery,
   wherein when the mobile electronic device and the charging accessory are coupled with each other through the first connector and the second connector, the fifth pin and the sixth pin are coupled with each other and become a common ground of the mobile electronic device and the charging circuit, the charging circuit outputs the second direct-current voltage through the first pin, the third pin, the fifth pin and the sixth pin to charge the first battery, and the charging circuit detects the instantaneous voltage through the second pin, and the fourth pin, the fifth pin and the sixth pin.

12. The charging accessory according to claim 11, wherein the second direct-current voltage is greater than or equal to the instantaneous voltage.

13. The charging accessory according to claim 11, wherein when the mobile electronic device and the charging accessory are coupled with each other through the first connector and the second connector, the charging circuit receives a charging specification of the first battery from the mobile electronic device through the first connector and the second connector, and the charging circuit charges the first battery according to the charging specification.

14. The charging accessory according to claim 13, wherein the charging specification comprises a rated voltage of the first battery, and the charging circuit controls a charging procedure of the first battery to prevent the instantaneous voltage from exceeding the rated voltage.

15. The charging accessory according to claim 13, wherein the charging specification comprises a maximum charging current of the first battery, and the charging circuit controls a charging procedure of the first battery to prevent a current supplied by the second direct-current voltage to the first battery from exceeding the maximum charging current.

16. The charging accessory according to claim 11, wherein the charging circuit comprises a second battery; when the charging accessory is coupled to the alternating-current voltage and not coupled to the mobile electronic device, the charging circuit charges the second battery with the first direct-current voltage; when the charging accessory is coupled to the mobile electronic device and not coupled to the alternating-current voltage, the charging circuit outputs the second direct-current voltage from the second battery to charge the first battery.

* * * * *